(12) United States Patent
Ogawa

(10) Patent No.: US 7,633,530 B2
(45) Date of Patent: Dec. 15, 2009

(54) IMAGE SENSING APPARATUS

(75) Inventor: Shigeo Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 473 days.

(21) Appl. No.: 11/407,011

(22) Filed: Apr. 18, 2006

(65) Prior Publication Data
US 2006/0238623 A1 Oct. 26, 2006

(30) Foreign Application Priority Data
Apr. 21, 2005 (JP) ............................ 2005-123989

(51) Int. Cl.
H04N 5/225 (2006.01)
H04N 9/73 (2006.01)
(52) U.S. Cl. .................. 348/220.1; 348/223.1; 348/655
(58) Field of Classification Search ............. 348/220.1, 348/223.1, 221.1, 222.1, 655; 382/162, 167
See application file for complete search history.

(56) References Cited

U.S. PATENT DOCUMENTS

| | | | | |
|---|---|---|---|---|
| 5,111,804 | A * | 5/1992 | Funakoshi | 600/109 |
| 5,260,774 | A * | 11/1993 | Takayama | 348/655 |
| 6,567,123 | B1 * | 5/2003 | Hashimoto | 348/229.1 |
| 6,727,949 | B1 * | 4/2004 | Saruwatari et al. | 348/349 |
| 6,876,768 | B1 * | 4/2005 | Kawade | 382/232 |
| 6,947,081 | B2 * | 9/2005 | Sakaegi | 348/223.1 |
| 6,963,374 | B2 * | 11/2005 | Nakamura et al. | 348/333.11 |
| 6,982,753 | B1 * | 1/2006 | Udagawa | 348/223.1 |
| RE39,410 | E * | 11/2006 | Kaneko et al. | 348/223.1 |
| 7,301,572 | B2 * | 11/2007 | Kitani | 348/247 |
| 7,304,681 | B2 * | 12/2007 | Larner et al. | 348/352 |
| 7,324,136 | B2 * | 1/2008 | Kubo | 348/220.1 |
| 7,443,425 | B2 * | 10/2008 | Ogawa | 348/221.1 |
| 7,528,865 | B2 * | 5/2009 | Saito | 348/220.1 |
| 2001/0040626 | A1 * | 11/2001 | Ohta et al. | 348/220 |

(Continued)

FOREIGN PATENT DOCUMENTS

JP 02-213817 8/1990

(Continued)

OTHER PUBLICATIONS

Notice of Allowance dated Dec. 11, 2007, concerning the corresponding Korean application.

*Primary Examiner*—Tuan Ho
*Assistant Examiner*—Marly Camargo
(74) *Attorney, Agent, or Firm*—Canon U.S.A. Inc., I.P. Division

(57) ABSTRACT

An image sensing apparatus which uses image sensors with different spectral sensitivities depending on driving modes executes still image sensing in accordance with a predetermined operation instruction from a user, during a predetermined operation of driving the image sensor in the driving mode different from still image sensing. In such still image sensing, a still image sensing white balance control value is obtained based on an image signal obtained by driving the image sensor in the driving mode for still image sensing, and a white balance is controlled in still image sensing. When returning to the predetermined operation state from still image sensing, the white balance control value obtained in still image sensing is converted to the white balance control value corresponding to the driving mode of the image sensor in the predetermined operation state to apply the obtained white balance control value.

6 Claims, 13 Drawing Sheets

U.S. PATENT DOCUMENTS

| | | | |
|---|---|---|---|
| 2003/0095191 | A1 | 5/2003 | Saito |
| 2003/0191776 | A1* | 10/2003 | Obrador ................... 707/104.1 |
| 2003/0218677 | A1* | 11/2003 | Nishimura ............... 348/223.1 |
| 2004/0189823 | A1* | 9/2004 | Shibutani ................. 348/231.1 |
| 2004/0189824 | A1* | 9/2004 | Shibutani ................. 348/231.2 |
| 2004/0189841 | A1* | 9/2004 | Oda et al. ................... 348/294 |
| 2004/0218059 | A1* | 11/2004 | Obrador et al. .......... 348/220.1 |
| 2005/0185064 | A1* | 8/2005 | Ogawa .................... 348/222.1 |
| 2006/0221204 | A1* | 10/2006 | Ogawa .................... 348/223.1 |
| 2007/0053565 | A1* | 3/2007 | Aridome et al. ............. 382/128 |
| 2009/0237519 | A1* | 9/2009 | Fujii ....................... 348/220.1 |

FOREIGN PATENT DOCUMENTS

| | | |
|---|---|---|
| JP | 05-130635 | 5/1993 |
| JP | 05-347728 | 12/1993 |
| JP | 2001-036787 | 2/2001 |
| JP | 2001-197516 | 7/2001 |
| JP | 2001-223921 | 8/2001 |
| JP | 2003-061103 | 2/2003 |
| JP | 2003-61113 | 2/2003 |
| JP | 2003-158653 | 5/2003 |
| JP | 2003-219341 | 7/2003 |
| JP | 2004-040417 A | 2/2004 |
| JP | 2004-158967 | 6/2004 |
| JP | 2004-172978 | 6/2004 |
| JP | 2004-247888 | 9/2004 |
| JP | 2004-297697 A | 10/2004 |
| JP | 2004-304425 | 10/2004 |
| JP | 2004-328460 | 11/2004 |
| JP | 2005-102315 | 4/2005 |
| JP | 2005102315 * | 4/2005 |

* cited by examiner

IMAGE SENSING APPARATUS

FIELD OF THE INVENTION

The present invention relates to an image sensing apparatus which processes an image signal sensed by an image sensing apparatus.

BACKGROUND OF THE INVENTION

In white balance control (to be abbreviated as WB hereinafter) of a general digital camera, reflected light from an object is analyzed, the type of light source is specified based on an obtained spectral distribution, and a white balance control value changes to obtain a color appearance independent of a light source color. Generally, when a light source changes in still image sensing, the white balance control value immediately changes following the change of the light source. However, during moving image sensing, the white balance control value changes following the change of the light source with a time constant.

In Japanese Patent Laid-Open No. 2003-61113, in still image sensing, the last white balance control value in a still image sensing standby state (the state of moving image sensing) is stored. The stored white balance control value is set again in returning to the still image sensing standby state (the state of moving image sensing) upon completion of still image sensing.

In the above patent reference, when returning to the still image sensing standby state upon completion of still image sensing, a digital camera sets the white balance control value immediately before still image sensing. Hence, as described above, based on the difference between the follow-up characteristics of still image sensing and moving image sensing with respect to the light source, the light source color cannot be completely corrected immediately after returning to the still image sensing standby state, thus posing a problem.

That is, in such white balance control, the tinctures of an image photographed by still image sensing and an image sensed by moving image sensing after still image sensing become different. As a result, color continuity cannot be maintained.

SUMMARY OF THE INVENTION

The present invention has been made in consideration of the above problems, and has as its object to maintain continuity of color appearances of images obtained by different operations such as a still image sensing operation and a moving image sensing operation.

According to the first aspect of the present invention, there is provided an image sensing apparatus comprising, still image sensing unit adapted to perform a second operation of executing a still image sensing in a first operation of performing moving image sensing, display unit adapted to display an image signal, first control unit adapted to control so as to obtain a white balance control value based on a first image signal obtained by the still image sensing, correct the first image signal based on the white balance control value, and display the corrected first image signal on the display unit, and second control unit adapted to control so as to correct a second image signal obtained in the first operation after the still image sensing, based on the white balance control value obtained in accordance with the first image signal, and display the corrected second image signal on the display unit after the first image signal is displayed on the display unit.

According to the second aspect of the present invention, there is provided an image sensing apparatus comprising, still image sensing unit adapted to perform a second operation of executing still image sensing in a first operation of performing moving image sensing, display unit adapted to display an image signal, and control unit adapted to control so as to perform white balance correction for a first image signal obtained in the first operation immediately before the second operation, display the corrected first image signal on the display unit, perform white balance correction for a second image signal obtained by the still image sensing, display the corrected first image signal on the display unit, perform white balance correction for a third image signal obtained in the first operation after the still image sensing, and display the corrected third image signal on the display unit, wherein the control unit controls a color appearance of the corrected third image signal to be displayed on the display unit so as to become more similar to a color appearance of the corrected second image signal to be displayed on the display unit than a color appearance of the corrected first image signal to be displayed on the display unit.

According to the third aspect of the present invention, there is provided an image sensing apparatus comprising, adjustment unit adapted to perform a second operation of executing at least one of a focus adjustment operation and an exposure adjustment operation for still image sensing in a first operation of performing moving image sensing, still image sensing unit adapted to perform a third operation of executing the still image sensing in the second operation, display unit adapted to display an image signal, and control unit adapted to control so as to perform white balance correction for a first image signal obtained in the second operation, display the corrected first image signal on the display unit, perform white balance correction for a second image signal obtained by the still image sensing, display the corrected second image signal on the display unit, perform white balance correction for a third image signal obtained in the first operation after the still image sensing, and display the corrected third image signal on the display unit, wherein the control unit controls a color appearance of the corrected third image signal to be displayed on the display unit so as to become more similar to a color appearance of the corrected second image signal to be displayed on the display unit than a color appearance of the corrected first image signal to be displayed on the display unit.

According to the forth aspect of the present invention, there is provided a control method comprising, a still image sensing step of performing a second operation of executing a still image sensing in a first operation of performing a moving image sensing, a display step of displaying an image signal, a first control step of controlling to obtain a white balance control value based on a first image signal obtained by the still image sensing, correct the first image signal based on the white balance control value, and display the corrected first image signal on display unit, and a second control step of controlling to correct a second image signal obtained in the first operation after the still image sensing, based on the white balance control value obtained based on the first image signal, and display the corrected second image signal on the display unit after the first image signal is displayed on the display unit.

According to the fifth aspect of the present invention, there is provided a control method comprising, a still image sensing step of performing a second operation of executing still image sensing in a first operation of performing moving image sensing, a display step of displaying an image signal, and a control step of controlling to perform white balance correction for a first image signal obtained in the first operation immediately before the second operation, display the corrected first image signal on a display unit, perform white balance correction for a second image signal obtained by the still image sensing, display the corrected first image signal on the display unit, perform white balance correction for a third image signal obtained in the first operation after the still image sensing, and display the corrected third image signal on the display unit, wherein in the control step, a color appearance of the corrected third image signal to be displayed on the display unit is controlled to become more similar to a color appearance of the corrected second image signal to be displayed on the display unit than a color appearance of the corrected first image signal to be displayed on the display unit.

According to the sixth aspect of the present invention, there is provided a control method comprising, an adjustment step of performing a second operation of executing at least one of a focus adjustment operation and an exposure adjustment operation for still image sensing in a first operation of performing moving image sensing, a still image sensing step of performing a third operation of executing the still image sensing in the second operation, a display step of displaying an image signal, and a control step of controlling to perform white balance correction for a first image signal obtained in the second operation, display the corrected first image signal on a display unit, perform white balance correction for a second image signal obtained by the still image sensing, display the corrected second image signal on the display unit, perform white balance correction for a third image signal obtained in the first operation after the still image sensing, and display the corrected third image signal on the display unit, wherein in the control step, a color appearance of the corrected third image signal to be displayed on the display unit is controlled to become more similar to a color appearance of the corrected second image signal to be displayed on the display unit than a color appearance of the corrected first image signal to be displayed on the display unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in accordance with the accompanying drawings.

First Embodiment

Figure 1:
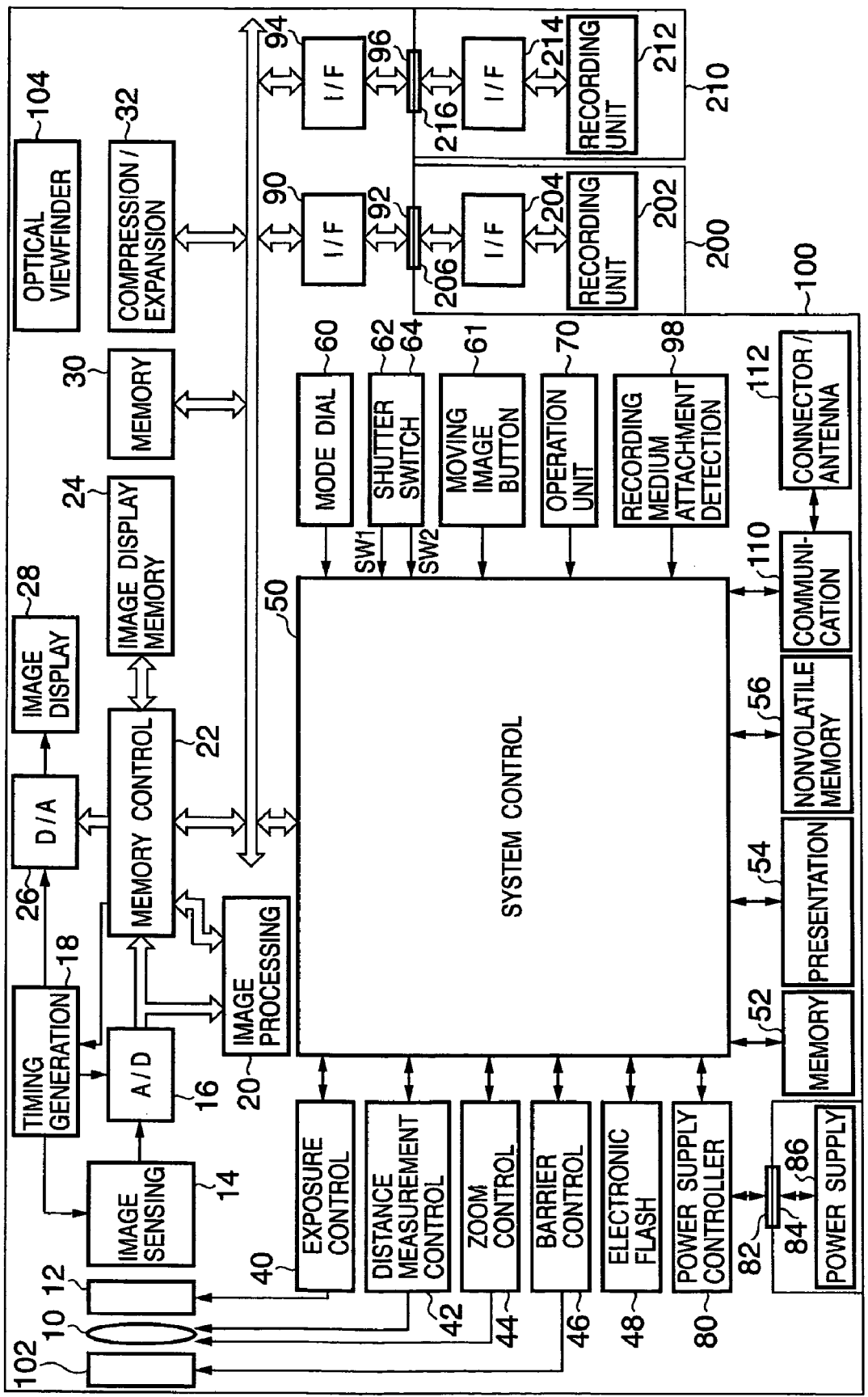
FIG. 1 is a block diagram of an image sensing apparatus according to the first embodiment.

FIG. 1 is a block diagram showing the arrangement of an image sensing apparatus 100 serving as an image processing apparatus according to the first embodiment. The image sensing apparatus 100 includes a lens 10 serving as an optical system, a shutter 12 having a stop function, and an image sensing element 14 which converts an optical image into an electrical signal. An A/D converter 16 converts an analog signal from the image sensing element 14 into a digital signal.

A timing generation circuit 18 supplies a clock signal or a control signal to the image sensing element 14, the A/D converter 16, and a D/A converter 26. The timing generation circuit 18 is controlled by a memory control circuit 22 and a system control circuit 50.

An image processing circuit 20 executes a predetermined pixel interpolation process or color conversion process for data from the A/D converter 16 or data from the memory control circuit 22. The image processing circuit 20 also executes a predetermined arithmetic process by using sensed image data, and supplies the obtained arithmetic result to the system control circuit 50. On the basis of the arithmetic result, the system control circuit 50 controls an exposure control unit 40 and a distance measurement control unit 42 to execute the AF (Auto Focus) process, AE (Auto Exposure) process, and EF (Electronic Flash pre-emission) process of a TTL (Through The Lens) scheme. The image processing circuit 20 also executes a predetermined arithmetic process by using the sensed image data, and executes the AWB (Auto White Balance) process of the TTL scheme on the basis of the obtained arithmetic result.

The memory control circuit 22 controls the A/D converter 16, the timing generation circuit 18, the image processing circuit 20, an image display memory 24, the D/A converter 26, a memory 30, and a compression/expansion circuit 32.

Data output from the A/D converter 16 is written in the image display memory 24 or the memory 30 through the image processing circuit 20 and memory control circuit 22, or directly through the memory control circuit 22.

Display image data written in the image display memory 24 is converted into an analog signal by the D/A converter 26, and displayed on an image display unit 28. When sensed image data is sequentially displayed using the image display unit 28, an electronic viewfinder (EVF) function can be implemented. The image display unit 28 can arbitrarily turn on/off display under the control of the system control circuit 50. When the image display unit 28 turns off display, power consumption of the image sensing apparatus 100 can largely be reduced.

The memory 30 stores a sensed still image or sensed moving image. The memory 30 has a storage capacity large enough to store a predetermined number of still images or a moving image for a predetermined time. Accordingly, even in panoramic sensing or continuous shooting for continuously taking a plurality of still images, a large quantity of images can quickly be written in the memory 30. The memory 30 can also be used as a work area of the system control circuit 50.

The compression/expansion circuit 32 executes an image data compression/expansion process by, e.g., Adaptive Discrete Cosine Transform (ADCT). The compression/expansion circuit 32 loads an image stored in the memory 30, executes compression/expansion process, and writes the processed data in the memory 30.

The exposure control unit 40 controls the stop function of the shutter 12. The exposure control unit 40 also has a flash brightness control function in cooperation with an electronic flash 48. The distance measurement control unit 42 controls focusing of the lens 10. A zoom control unit 44 controls zooming of the lens 10. A barrier control unit 46 controls the operation of a protection unit 102 serving as a barrier. The electronic flash 48 has an AF auxiliary light projecting function and the flash light control function in addition to a light emission function for a flash sensing operation. The exposure control unit 40 and the distance measurement control unit 42 are controlled by the TTL scheme. On the basis of an arithmetic result obtained from the image processing circuit 20 by processing sensed image data, the system control circuit 50 controls the exposure control unit 40 and the distance measurement control unit 42.

The system control circuit 50 controls the entire image sensing apparatus 100. The memory 52 stores constants, variables, and programs for the operations of the system control circuit 50. The memory 52 also stores a program diagram used in AE. The program diagram is a table which defines the relationship between a stop aperture diameter for an exposure value and a shutter speed control value.

Under the control of the system control circuit 50, a presentation unit 54 notifies a user of the operation state or a message by using characters, images, or sound (speech). The presentation unit 54 includes a combination of output devices such as an LCD, LED, speaker, and the like. One or a plurality of presentation units 54 are arranged at visible positions near an operation unit of the image sensing apparatus 100. Part of the presentation unit 54 is arranged in an optical viewfinder 104. Of the presentation contents of the presentation unit 54, examples of indication on an LCD or the like are the single shot/continuous shooting, self timer, compression ratio, number of recording pixels, number of recorded images, number of recordable images, shutter speed, F-number, exposure correction, electronic flash, red-eye effect relaxation, macro sensing, buzzer setting, timer battery level, battery level, error, information by a plurality of digits, attached state of recording mediums 200 and 210, operation of communication I/F, and date/time. The optical viewfinder 104 displays some functions of the presentation unit 54, including, e.g., in-focus indication, camera shake warning indication, electronic flash charge indication, shutter speed indication, F-number indication, and exposure correction indication.

A nonvolatile memory 56 is an electrically erasable/recordable memory. For example, an EEPROM or the like is used as the nonvolatile memory 56.

Reference numerals 60, 61, 62, 64, and 70 denote operation units for inputting various kinds of operation instructions for the system control circuit 50. They comprise a switch, dial, touch panel, or pointing by detection of a line of sight, and voice recognition device, or the like. These operation units will be described here in detail.

The mode dial switch 60 switches function modes such as power off, auto image sensing mode, image sensing mode, panoramic image sensing mode, playback mode, multiwindow playback/erase mode, and PC connection mode. The moving image button 61 is used to input an instruction to start/end moving image sensing. Moving image sensing is started by pressing the moving image button 61, and ended by pressing the moving image button 61 again during moving image sensing.

The shutter switch (SW1) 62 is turned on in the half-stroke state of a shutter button (not shown). The ON shutter switch (SW1) 62 instructs the start of an operation such as AF (Auto Focus) process, AE (Auto Exposure) process, AWB (Auto White Balance) process, or EF (Electronic Flash preemission) process. The shutter switch (SW2) 64 is turned on upon fully pressing a shutter button (not shown). The ON shutter switch (SW2) 64 instructs the start of a series of processing operations including an exposure process (a process of writing a signal as raw image data read from the image sensing element 14 in the memory 30 through the A/D converter 16 and the memory control circuit 22), development process (a process of converting the raw image data into an image in arithmetic process performed by the image processing circuit 20 or the memory control circuit 22), and recording process (a process of reading out image data from the memory 30, causing the compression/expansion unit 32 to compress the image data, and writing it in the recording medium 200 or 210).

The operation unit 70 includes various kinds of buttons and a touch panel. The switches and buttons of the operation unit 70 include a menu button, set button, macro button, multiwindow playback page break button, electronic flash setting button, single shot/continuous shot/self timer switching button, menu move+(plus) button, menu move−(minus) button, playback image move+(plus) button, playback image move−(minus) button, sensed image quality selection button, exposure correction button, and date/time setting button.

A power supply control unit 80 includes a battery detection circuit, DC/DC converter, and switch circuit which selects a block to be energized. The power supply control unit 80 detects the presence/absence of a battery, battery type, and battery level, controls the DC/DC converter on the basis of the detection result and an instruction from the system control circuit 50, and supplies a necessary voltage to the units including a recording medium for a necessary period. A power supply unit 86 is connected to the power supply control unit 80 via connectors 82 and 84. The power supply unit 86 includes a primary cell such as an alkaline cell or lithium cell, a secondary cell such as a BNiCd cell, NiMH cell, or Li cell, or an AC adapter.

Interfaces 90 and 94 connect a system bus to the recording media such as a memory card and hard disk. The interfaces 90 and 94 are connected to the recording media such as a memory card and hard disk which are detachable via connectors 92 and 96. A recording medium attachment detection unit 98 detects whether the recording medium 200 or 210 is attached to the connector 92 or 96.

This embodiment will be described assuming that the apparatus has two systems of interfaces and connectors to which recording media are attached. The apparatus may have one or a plurality of systems of interfaces and connectors to which recording media are attached, as a matter of course. In addition, interfaces or connectors of different standards may be combined. Interfaces and connectors based on a standard such as a PCMCIA card or CF (CompactFlash®) card may be used.

When the interfaces 90 and 94 and connectors 92 and 96 based on a standard such as a PCMCIA card or CF (CompactFlash®) card are used, and various kinds of communication cards such as a LAN card, modem card, USB card, IEEE1394 card, P1284 card, SCSI card, or communication card for PHS is connected, image data or management information associated with the image data can be transferred to/from another computer or a peripheral device such as a printer.

The protection unit 102 serves as a barrier which covers the image sensing unit including the lens 10 of the image sensing apparatus 100 to prevent any dirt or damage to the image sensing unit. Sensing can be executed by using only the optical viewfinder 104 without using the electronic viewfinder function by the image display unit 28. As described above, the optical viewfinder 104 incorporates some functions of the presentation unit 54, including, e.g., in-focus indication, camera shake warning indication, electronic flash charge indication, shutter speed indication, F-number indication, and exposure correction indication.

A communication unit 110 has various kinds of communication functions such as RS232C, USB, IEEE1394, P1284, SCSI, modem, LAN, and wireless communication. Reference numeral 112 denotes a connector for wired communication using the communication unit 110, while it denotes an antenna for wireless communication using the communication unit 110.

The recording medium 200 includes a memory card or hard disk. The recording medium 200 comprises a recording unit 202 including a semiconductor memory or magnetic disk, an interface 204 to the image sensing apparatus 100, and a connector 206 connected to the image sensing apparatus 100. Similar to the recording medium 200, the recording medium 210 comprises a recording unit 212, an interface 214, and a connector 216.

Figure 2:
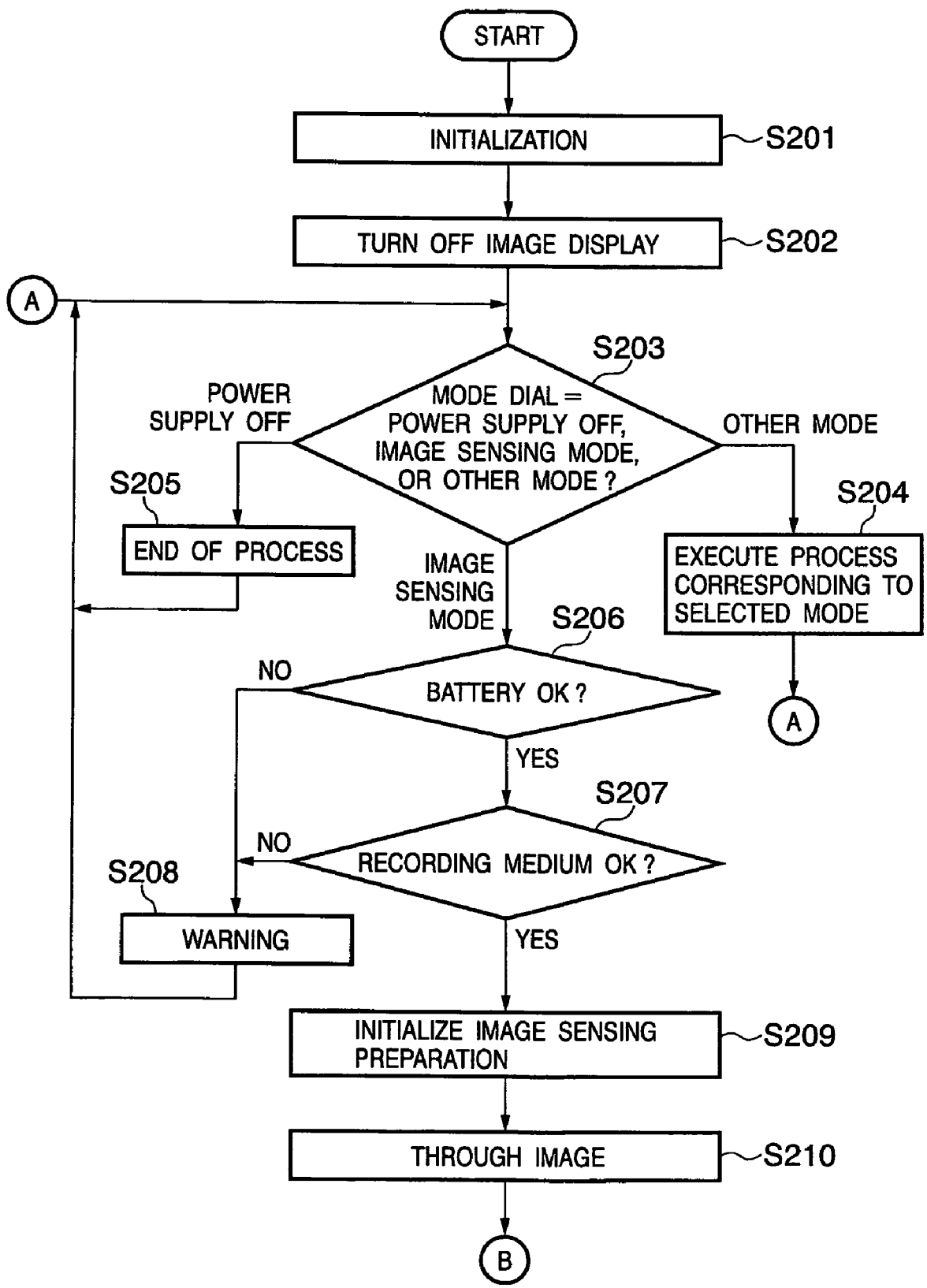
FIG. 2 is a flowchart showing operation processing of a main routine in the image sensing apparatus according to the first embodiment.
Figure 3:
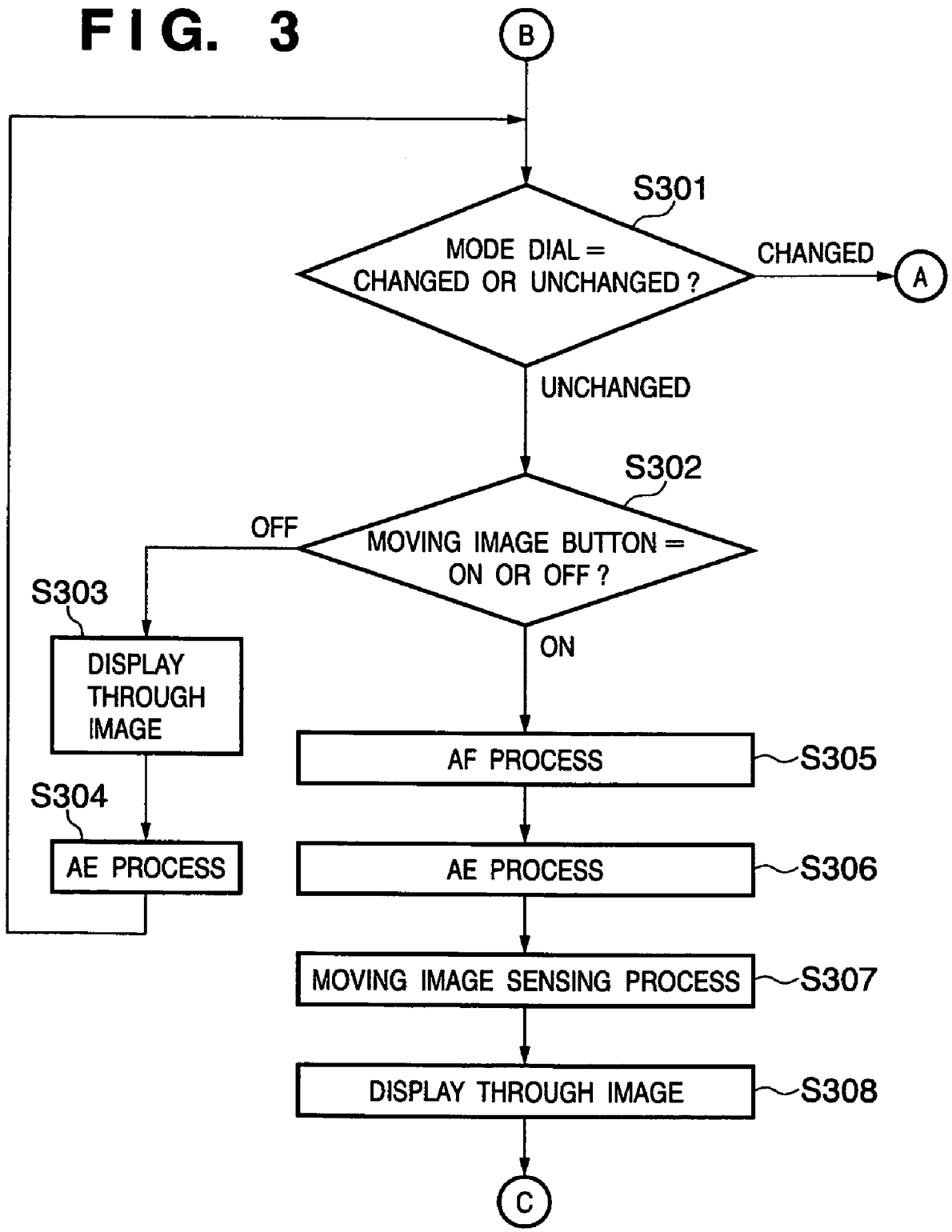
FIG. 3 is a flowchart showing an operation process of starting moving image recording operation in the image sensing apparatus according to the first embodiment.
Figure 4:
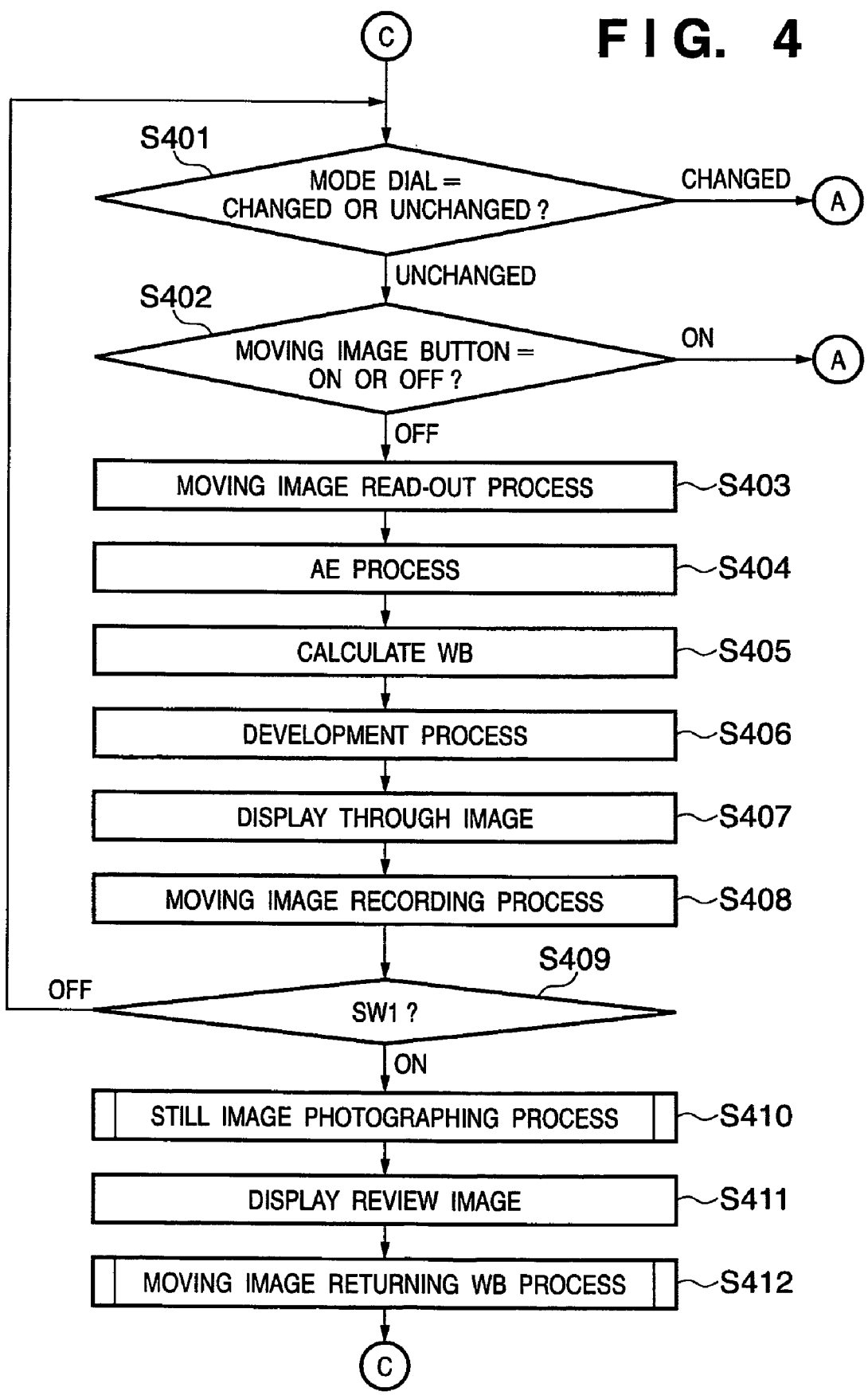
FIG. 4 is a flowchart showing an operation process of moving image sensing in the image sensing apparatus according to the first embodiment.

FIGS. 2, 3, and 4 are flowcharts for explaining the main operations of the image sensing apparatus 100 according to the first embodiment. The following processing is implemented when the system control circuit 50 executes a control program stored in the memory 52.

This process starts when the image sensing apparatus 100 is powered on by, e.g., loading a new battery. In step S201, the system control circuit 50 initializes various kinds of flags and control variables. In step S202, the system control circuit 50 initializes the display states of the image display unit 28 to the OFF state.

In step S203, the system control circuit 50 determines the operation mode set in accordance with the position of the mode dial 60. If the mode dial 60 is set to power OFF, the flow advances to step S205 to execute end processing. The end processing includes the following processes. That is, the display states of the presentation unit 54 and display unit 28 are changed to the end state. The protection unit 102 is closed to protect the image sensing unit. Necessary parameters, set values, and set modes, including flags and control variables, are stored in the nonvolatile memory 56. The power supply control unit 80 cuts off unnecessary power of the units of the image sensing apparatus 100, including the image display unit 28. After the end processing is executed, the flow returns to step S203.

If the mode dial 60 is set to the image sensing mode, the flow advances from step S203 to step S206 to execute the image sensing mode. On the other hand, if the mode dial 60 is set to any other mode, the flow advances from step S203 to step S204. In step S204, the system control circuit 50 executes processing corresponding to the selected mode. After the end of the processing, the flow returns to step S203.

If the mode dial 60 is set to the image sensing mode, in step S206, the system control circuit 50 determines, under the control of the power supply control unit 80, whether the level or operation state of the power supply 86 including a battery or the like has a problem in the operation of the image sensing apparatus 100. If any problem is found, the flow advances to step S208. In step S208, a predetermined warning is displayed on the presentation unit 54 by an image or sound, and the flow returns to step S203. If no problem is found, the flow advances to step S207. In step S207, the system control circuit 50 determines whether the operation state of the recording medium 200 or 210 has a problem for the operation of the image sensing apparatus 100 and, more particularly, the image data recording/playback operation for the recording medium. If NO in step S207, the flow advances to step S208. In step S208, a predetermined warning is displayed on the presentation unit 54 by an image or sound, and the flow returns to step S203. If YES in step S207, the flow advances to step S209.

In step S209, sensing preparation (initialization) is performed to display a through image (moving image sensed by the image sensing element 14) on the image display unit 28. In this case, signals are added and read out (addition/reading) for each set of lines from the image sensing element. Upon completion of sensing preparation, in step S210, the through image is started to be displayed on the image display unit 28. That is, a moving image sensed by the image sensing element 14 is displayed to implement the electronic viewfinder function. In the through display state, data which are sequentially written in the image display memory 24 through the image sensing element 14, A/D converter 16, image processing circuit 20, and memory control circuit 22 are sequentially displayed on the image display unit 28 via the memory control circuit 22 and D/A converter 26. Note that in the driving mode of the image sensing element 14 for through image display, "addition/reading" can be performed as in moving image sensing (to be described later).

FIGS. 3 and 4 are flowcharts for explaining a process when moving image sensing is instructed in the image sensing mode. Note that the flowchart of FIG. 4 also includes a process when still image sensing is instructed during moving image sensing.

The system control circuit 50 checks the state of the mode dial 60. If the state of the mode dial 60 has changed from the image sensing mode, the flow returns to step S203. On the other hand, if the state of the mode dial 60 has not changed, the flow advances to step S302. In step S302, the state of the moving image button 61 is checked. If the moving image button 61 has not been pressed, the flow advances to step S303 to continue through image display. As in step S304, in order to continue through image display, the AE process is performed. In the AE process, the image processing circuit 20 executes predetermined photometry for a signal obtained from the image sensing element 14, and the obtained arithmetic result is stored in the memory 30. On the basis of this arithmetic result, the system control circuit 50 executes the AE process for the through image using the exposure control unit 40. After that, the flow returns to step S301.

If it is determined that the moving image button 61 has been pressed in step S302, the flow advances to step S305. In step S305, the AF process is performed for moving image sensing. In this AF process, the image processing circuit 20 executes predetermined distance measurement for a signal obtained from the image sensing element 14, and the obtained arithmetic result is stored in the memory 30. On the basis of this arithmetic result, the system control circuit 50 executes the AF process using the zoom control unit 44, and focuses the lens 10. After that, the flow advances to step S306 to execute the AE process in the same procedure as in step S304.

In step S307, a moving image sensing process is executed for a sequential image sensing operation. The memory 30 receives the image data from the image sensing element 14 via the A/D converter 16. The predetermined development and compression processes such as JPEG are then performed for the readout image data, and the processed image data is stored in the memory 30. The compressed image data stored in the memory 30 is written in the recording medium 200 as a moving image file, and the flow advances to step S308. In step S308, the image sensed in step S307 is displayed on the image display unit 28 as the through image to complete a moving image sensing start process. After that, moving image sensing and recording (steps S403 to S407) are executed until the setting of the mode dial 60 changes, or the moving image button 61 is pressed again.

Upon starting moving image sensing as described above, a process is executed during moving image sensing as shown in FIG. 4.

In step S401, it is determined whether the mode of the mode dial 60 has changed. If the mode of the mode dial 60 has changed, the moving image sensing process ends, and the flow returns to step S203. If the mode of the mode dial 60 has not changed, the flow advances to step S402. In step S402, it is determined whether the moving image button 61 has been pressed. If depression of the moving image button 61 is detected during moving image sensing, the moving image sensing process ends. The flow then returns to step S203. In step S402, when the moving image button has not been pressed, the flow advances to step S403, and the moving image sensing process is continued.

In step S403, a moving image read-out process is performed. In this moving image read-out process, an image sensing signal is read out from the image sensing element 14 by performing addition/reading. The image sensing signal read out from the image sensing element 14 is converted into a digital signal by the A/D converter 16, and saved in the memory 30 (exposure process). That is, the memory 30 saves unprocessed image data which has not undergone a signal process. In step S404, the AE process is performed as in step S304 or S306. That is, the image processing circuit 20 performs predetermined photometry for the signal obtained from the image sensing element 14, and the arithmetic result is stored in the memory 30. On the basis of this arithmetic result, the system control circuit 50 performs the AE process using the exposure control unit 40. Note that the AF process may be performed as in step S305.

In step S405, in accordance with an instruction from the system controller 50, the image processing circuit 20 reads out the image data stored in the memory 30 in step S403, and obtains a control value for color correction, i.e., white balance control value (WB control value) based on this image data.

The obtained WB control value is stored in the memory 30 as a moving image WB control value. In step S406, the image data stored in the memory 30 in step S403 has undergone a so-called development process such as color correction (white balance process) based on the WB control value which is obtained in step S405 and stored in the memory 30. In step S407, through image display is performed on the image display unit 28 by using the image developed in step S406. In step S408, a predetermined compression process such as JPEG is performed for the image data saved in the memory 30 in order to play back the image obtained by moving image sensing, even after moving image sensing. The processed image data is saved in the memory 30 (recording process). The compressed image data saved in the memory 30 is then written in the recording medium 200 as a moving image file. The flow then advances to step S409.

Until the half-stroke state (ON state of the signal of the shutter switch (SW1) 62) of the shutter button for recording a still image is detected, the moving image sensing processes in steps S401 to S408 are repeated. In step S409, upon detection of the ON state of the signal of the shutter switch (SW1) 62, the flow advances to step S410 to start still image sensing during moving image sensing.

In step S410, still image sensing is performed during moving image sensing. The details of a still image sensing process during moving image sensing in step S410 will be described below with reference to the flowchart in FIG. 5. In step S411, a review image for still image sensing in step S410 is displayed. That is, the image (or thumbnail images of the image) recorded by still image sensing is displayed on the image display unit 28. After the review image is displayed for a predetermined period of time in step S411, the flow advances to step S412. In step S412, the white balance process (moving image returning WB process) is executed to return to the moving image sensing state. The details of this moving image returning WB process will be described with reference to FIG. 6.

Figure 5:
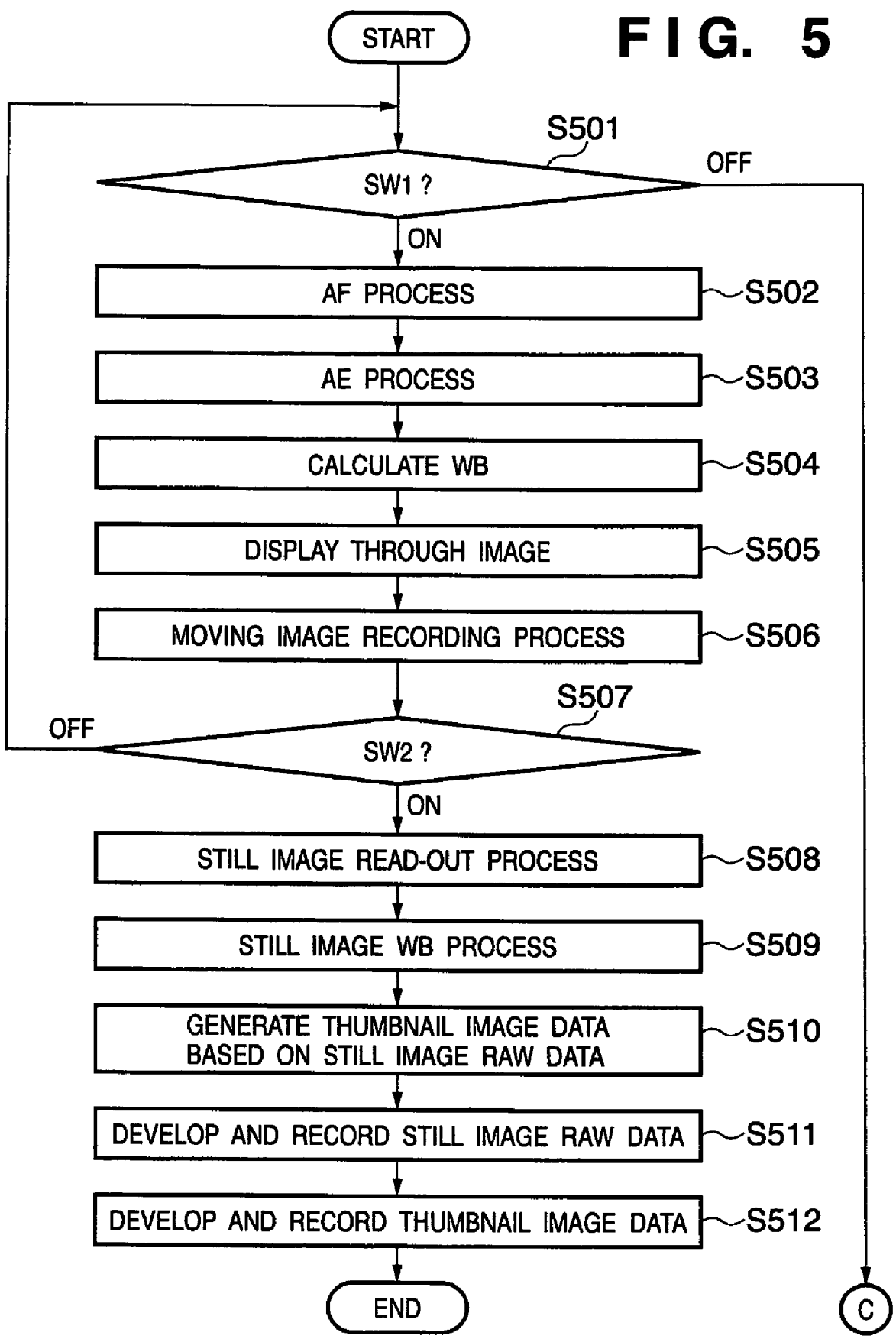
FIG. 5 is a flowchart showing an operation process of still image sensing during moving image sensing in the image sensing apparatus according to the first embodiment.

FIG. 5 is a flowchart showing the still image sensing process during moving image sensing in step S410. When the half-stroke state of the shutter button is released, the process ends to return to a normal moving image sensing state. Hence, in step S501, it is determined whether the shutter switch (SW1) 62 is ON. If the shutter switch (SW1) 62 is OFF, the process ends to continue moving image sensing, and the flow returns to step S401. On the other hand, if the shutter switch (SW1) 62 is ON, the flow advances to step S502.

In steps S502 and S503, the AF and AE processes are performed and locked as in steps S305 and S306 in FIG. 3. Then, the WB process is performed in step S504, the through image display (EVF display) is performed in step S505, and the moving image recording process is performed in step S506. These processes are the same as those in steps S405 to S408 in FIG. 4. That is, until the shutter switch (SW1) 62 and the shutter switch (SW2) 64 are turned on, preparation is performed (AF and AE are locked) for still image sensing, and moving image sensing is continued. On the other hand, when the shutter switch (SW2) 64 is pressed, the flow advances from step S507 to step S508 to execute the still image sensing process.

In step S508, a series of still image sensing operations are performed. That is, the image sensing element 14 is driven in a driving mode for still image sensing (a signal is read from the image sensing element by performing non-addition (non-addition/reading)). The unprocessed image data (still image RAW data) which is read from the image sensing element 14 via the A/D converter 16 and has not undergone the signal process is saved in the memory 30. In step S509, the image processing circuit 20 reads out, from the memory 30, the still image RAW data stored in step S508. The WB control value is calculated based on the data. This WB control value is stored in the memory 30.

In step S510, a thumbnail formation process is performed for the still image RAW data stored in the memory 30 in step S505 to obtain a thumbnail image (the RAW data of a substitution frame) serving as the substitution frame of a moving image frame omitted in still image sensing. In step S511, the development process including color correction (white balance) is performed, by using the still image WB control value determined in step S509, for the still image RAW data stored in the memory 30 in step S508. After that, a predetermined compression process such as JPEG is performed for the image data obtained in the development process. The obtained compressed image data is saved in the memory 30 as a still image file. In step S512, the development process including color correction (white balance) is performed, using the white balance control value determined in step S509, for the thumbnail image obtained in step S510. The image data obtained in the development process is compressed by JPEG or the like, and added to the moving image file generated in step S407, as a substitution frame of the omitted frame. Then, still image sensing during moving image sensing ends.

In the above-described processes, the thumbnail image is generated by using the still image RAW data. However, the thumbnail image may be generated by using the still image data after development.

Figure 6:
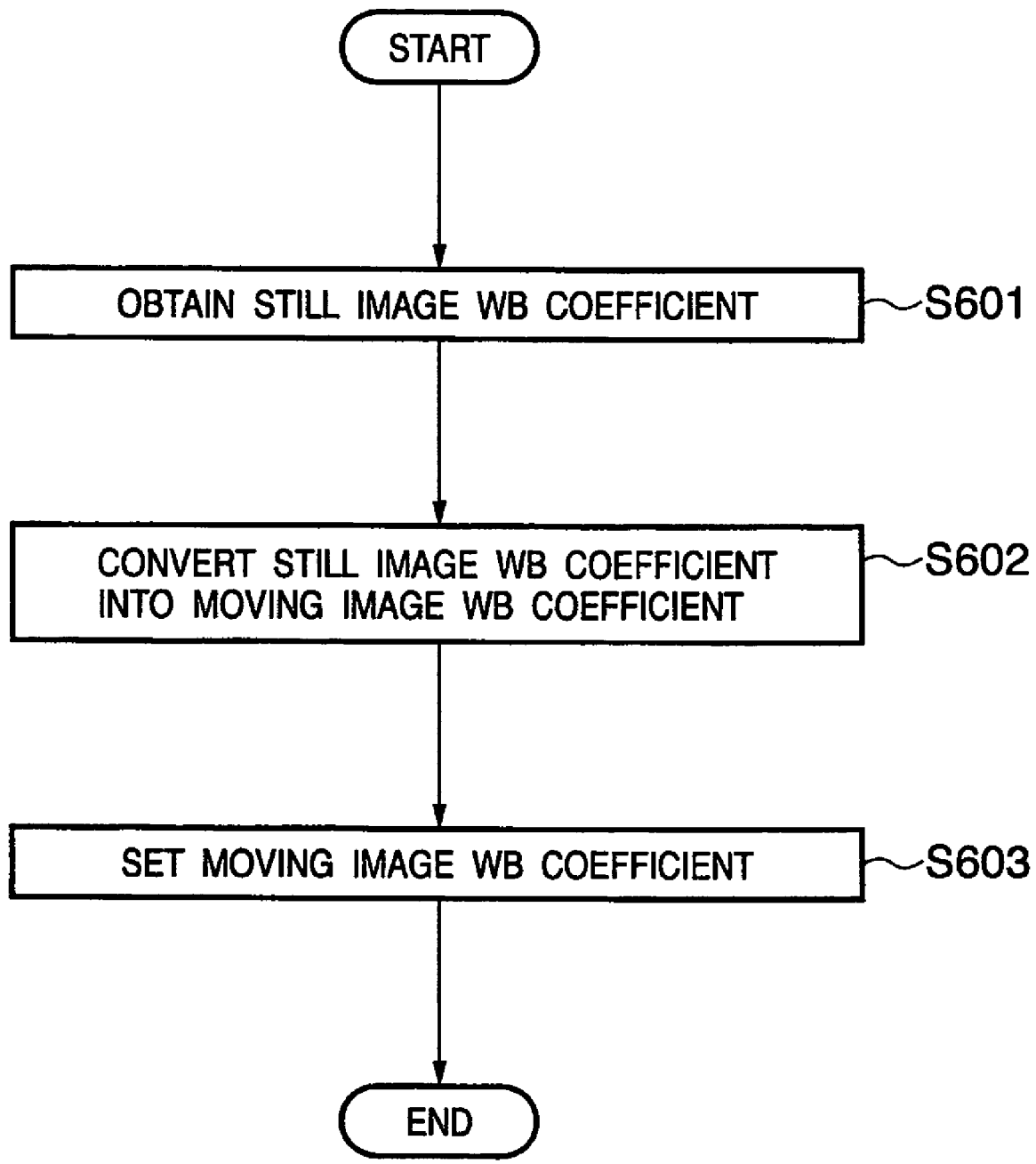
FIG. 6 is a flowchart showing a white balance process when returning to a moving image sensing state in the image sensing apparatus according to the first embodiment.

FIG. 6 is a flowchart showing a white balance process for returning to the moving image state in step S412 of FIG. 4.

In step S601, the white balance control value obtained from the still image RAW data in step S506 is read out from the memory 30, and the readout value is stored in the memory 30 as a still image white balance control value. In step S602, the still image white balance control value stored in the memory 30 in step S601 is converted into the moving image white balance control value. The obtained moving image white balance control value is stored in the memory 30. The conversion method will be described with reference to FIG. 8. In step S603, the moving image white balance control value calculated in step S602 is preset to the image processing circuit 20, and the white balance process for returning to the moving image sensing state ends.

Figure 7:
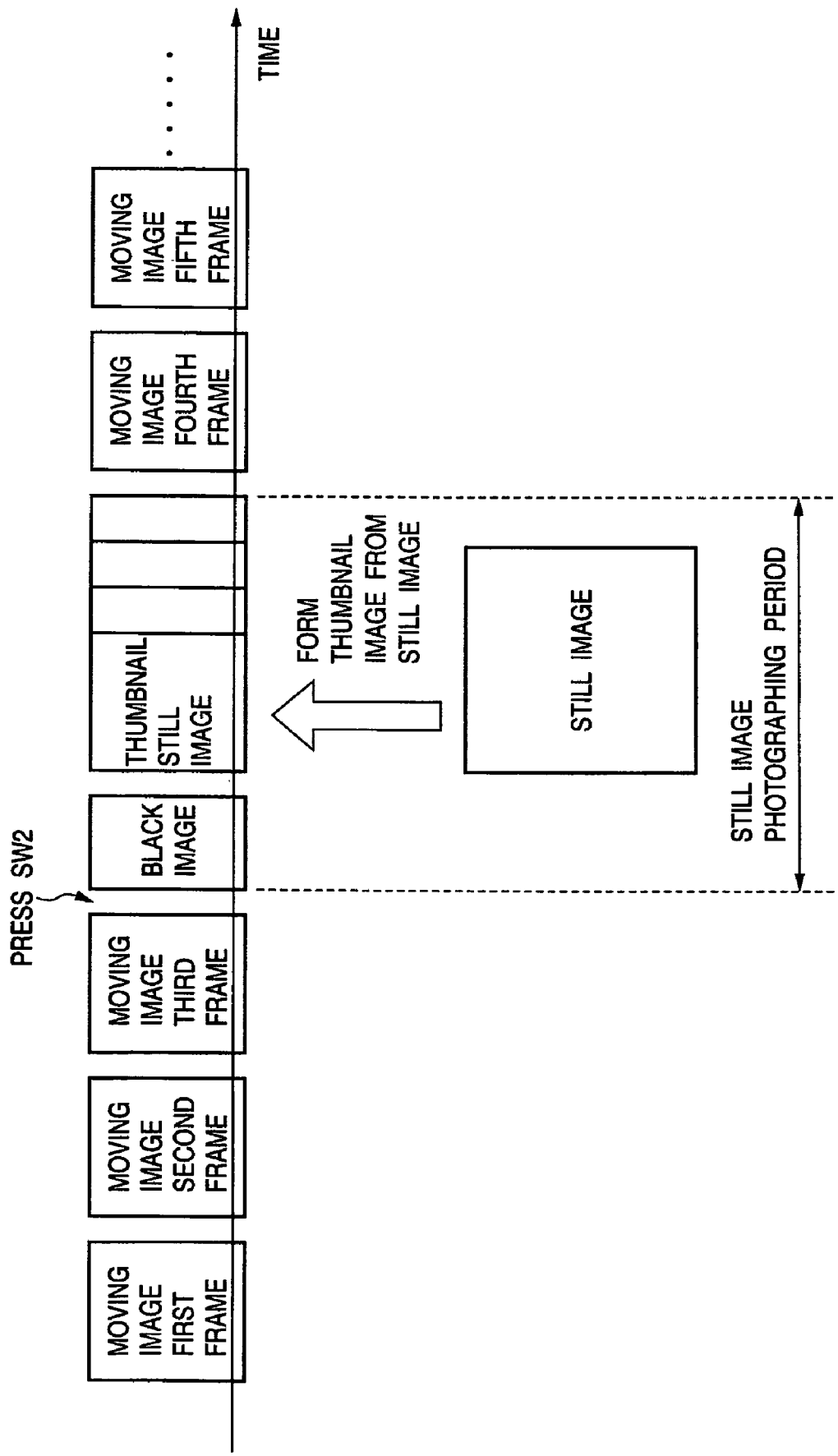
FIG. 7 is a timing chart of still image sensing during moving image sensing in the image sensing apparatus according to the first embodiment.

FIG. 7 is a timing chart showing a sequence in a time direction in still image sensing during moving image sensing. When the shutter switch (SW2) 64 is turned on while moving image sensing is continued, a still image is sensed, and a thumbnail image (step S512) of the still image is used as a substitution frame of the moving image. In accordance with the period of still image sensing, the plurality of substitution frames are used. Upon completion of still image sensing during moving image sensing, moving image sensing is restarted. Note that a black image corresponding to one frame inserted immediately after input of the SW2 signal may be omitted.

Figure 8:
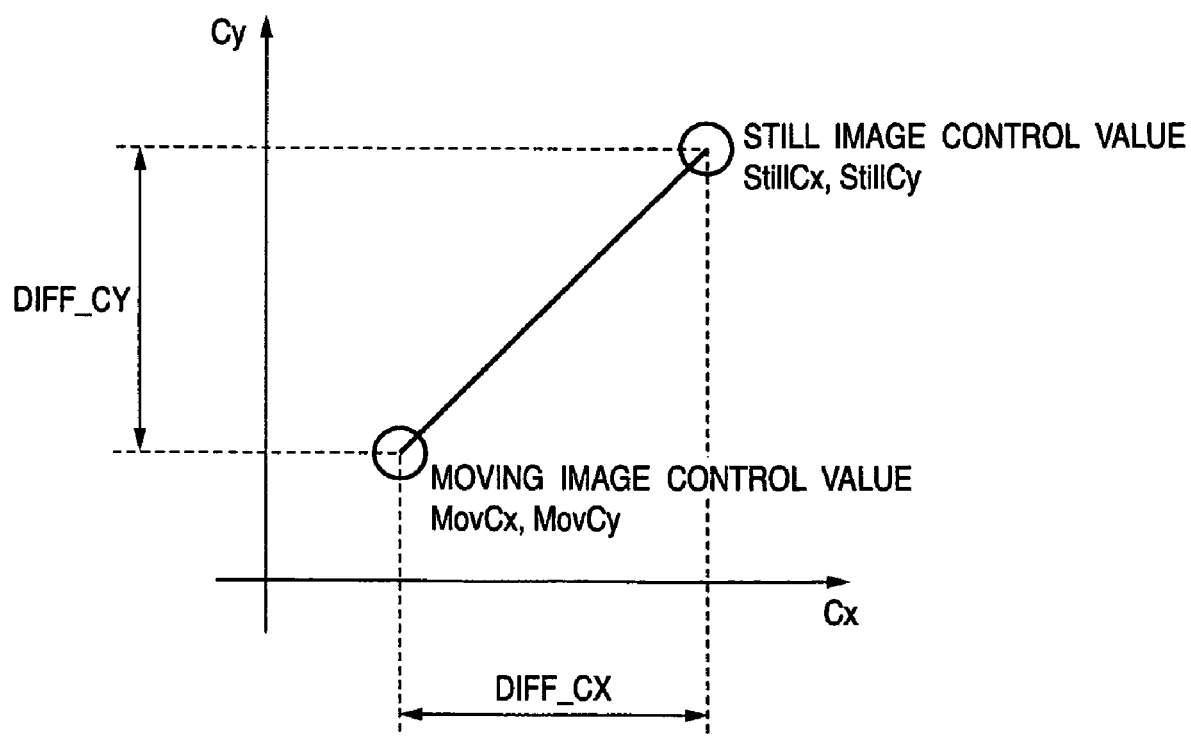
FIG. 8 is a graph showing an example of correction conversion in accordance with a spectral sensitivity in the white balance process of still image sensing during moving image sensing in the image sensing apparatus according to the first embodiment.

FIG. 8 is a graph showing an example of interconversion between the moving image white balance control value and the still image white balance control value. A spectral sensitivity for each driving mode (the driving mode of still image sensing or moving image sensing) in the image sensing element is measured in advance (for each of R, G, and B) to obtain the difference between the spectral sensitivities of these operations on a Cx-Cy coordinate system in an X-Y chromaticity diagram. In FIG. 8, each of DIFF_CX and DIFF_CY represents the difference between the spectral sensitivities for these driving modes. When the moving image white balance control value is represented by coordinates (MovCx, MovCy), the still image white balance control value represented by coordinates (StillCx, StillCy) can be obtained when correcting by DIFF_CX and DIFF_CY depending on the driving mode of the image sensing element.

In this case, the spectral sensitivity is corrected in the X-Y chromaticity diagram. However, another correction means can be used. For example, the spectral sensitivity may be corrected by multiplying a color gain for each of R, G, and B by a predetermined coefficient. In this case, a conversion method of the moving image white balance control value and the still image white balance control value is described. However, the white balance control value may be converted by the same method even when converting into a WB control value (EVF WB control value) for electronic viewfinder display without moving image sensing and still image sensing. This point will be described in the second embodiment.

Figure 9:
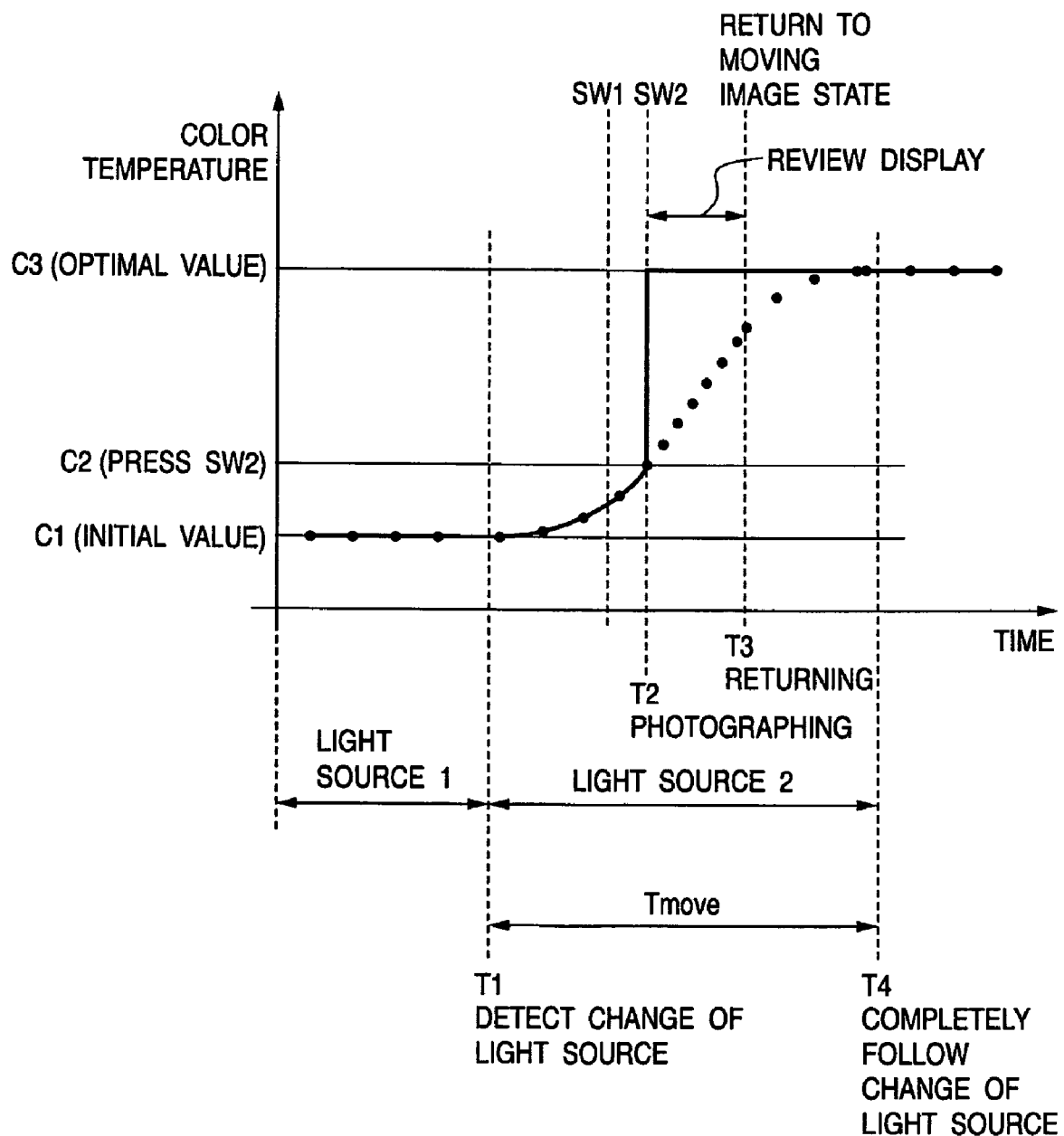
FIG. 9 is a graph showing a change, in a time direction, of the white balance process of still image sensing during moving image sensing in the image sensing apparatus according to the first embodiment.

FIG. 9 is a graph showing a case wherein the WB changes following the change of an object light source during moving image sensing. The graph indicated by the dotted line is the track of the WB which changes following the change of the light source during moving image sensing. When an optimal color temperature for a light source 1 is C1 in FIG. 9, the graph indicated by the dotted line represents the change of the color temperature in the time direction while changing the light source from the light source 1 to a light source 2 at a time T1.

When a change from the light source 1 to the light source 2 is detected at the time T1, the change to the light source 2 is completely followed by a time Tmove. When the WB control value immediately changes to follow the change from the light source 1 to the light source 2, the image color also immediately changes and becomes unnatural. Additionally, the image flickers following the frequent changes between the light source 1 and the light source 2, thus posing a problem. To cope with this, the WB control value gradually changes with the time Tmove. When the change to the light source 2 is completely followed, the color temperature becomes C3. As described above, the change of the light source is completely followed with the time Tmove from when the change of the light source is detected.

Since such control is performed in moving image sensing, a still image may be sensed at the time T2 in FIG. 9 during follow-up operation for the change of the light source. In this case, during follow-up operation for the change of the light source, the color temperature is C2. Note that since moving image sensing is continued in the half-stroke state of the shutter button, i.e., in a state wherein the shutter switch (SW1) 62 is ON and the shutter switch (SW2) 64 is OFF, the change of the light source is continuously followed.

A graph indicated by the solid line in FIG. 9 represents a state wherein the WB changes following the change of the light source by the method described in step S412 in FIG. 4 and FIG. 6. Similarly, the WB starts changing following the change of the object light source after detecting the change at the time T1. However, in this case, when still image sensing is performed at the time T2, the WB can change following the change of the object light source by the WB process using the still image RAW data as in step S509 in FIG. 5. Subsequently, by executing the process (moving image returning WB process) in FIG. 6, the color temperature C3 corresponding to the change of the object light source can be maintained even after returning to the moving image sensing state at a time T3. That is, subsequently, moving image sensing is restarted using the moving image WB control value corresponding to the WB control value based on the still image RAW data, and this WB control value is used until the change of the light source is detected.

In contrast to this, in a general image sensing apparatus, the moving image sensing WB control value is not generated based on the still image data. Hence, the WB control value (the WB control value at the time T2 in FIG. 9) immediately before still image sensing is used as the WB control value corresponding to the driving mode of moving image sensing when returning to the moving image sensing state. As a result, the color appearance of a moving image substitution frame derived from a still image becomes different from that obtained when returning to the moving image sensing state, and the moving image becomes unnatural. In the first embodiment, the moving image sensing WB control value corresponding to the still image sensing WB control value can be obtained, thus preventing such unnatural impression.

According to the first embodiment, the state returns to the moving image sensing state after review display based on the still image sensed by still image sensing. Hence, the color appearance in moving image sensing after still image sensing during moving image sensing becomes more similar to that of the review display image than that obtained at the start of the shutter button half stroke operation (when the shutter switch (SW1) 62 is ON) for still image sensing.

The above-described moving image returning WB process in step S412 is a process without electronic flash sensing in the still image sensing process in step S410. In order to perform electronic flash sensing in step S410, the moving image returning WB process in step S412 is executed as follows.

The WB control value (the WB control value at the time T2 in FIG. 9) immediately before still image sensing is obtained (S601) as the WB control value corresponding to the driving mode of moving image sensing when returning to the moving image sensing state. The obtained WB control value is set to the image processing circuit without the process in step S602 (S603). That is, the color appearance of moving image sensing after still image sensing during moving image sensing becomes more similar to that obtained at the start of the shutter button half stroke operation (when the shutter switch (SW1) 62 is ON) for still image sensing than that of the review display image.

The color temperature in electronic flash sensing is largely different from those in other states. Therefore, the color appearance becomes unnatural when the obtained WB control value is applied to moving image sensing after still image sensing, regardless of electronic flash sensing.

Second Embodiment

In the first embodiment, in still image sensing during moving image sensing, the moving image sensing WB control value is derived from the WB control value calculated in still image sensing, and the derived WB control value is used in subsequent moving image sensing. In the second embodiment, a case wherein the present invention is applied to a WB control value setting process for image display on an electronic viewfinder (EVF) in still image sensing, in order to display, before still image sensing, a moving image on the electronic viewfinder to confirm an object to be sensed will be described with reference to FIGS. 10 to 12.

Figure 10:
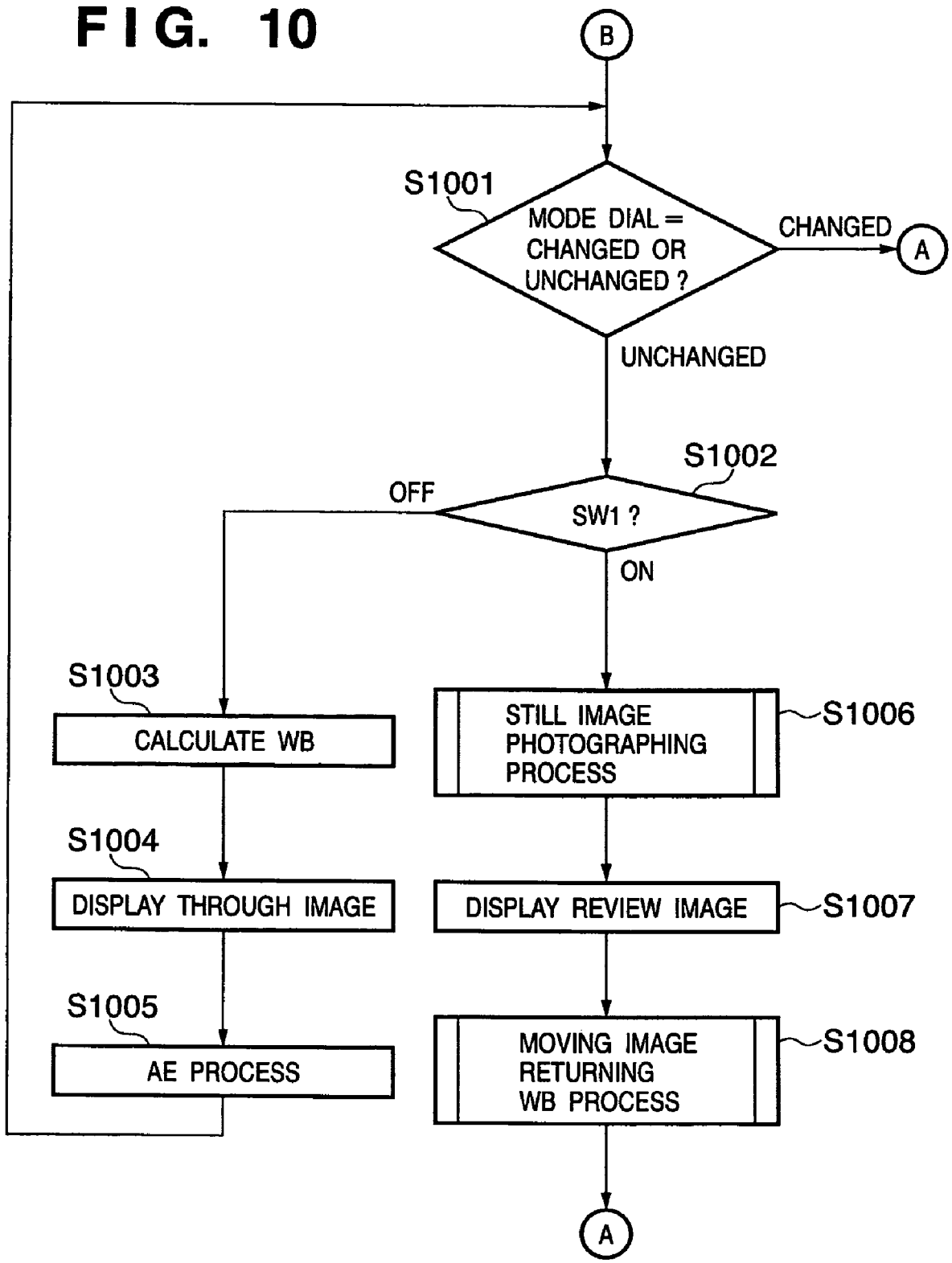
FIG. 10 is a flowchart showing an operation process of still image sensing in an image sensing apparatus according to the second embodiment.
Figure 11:
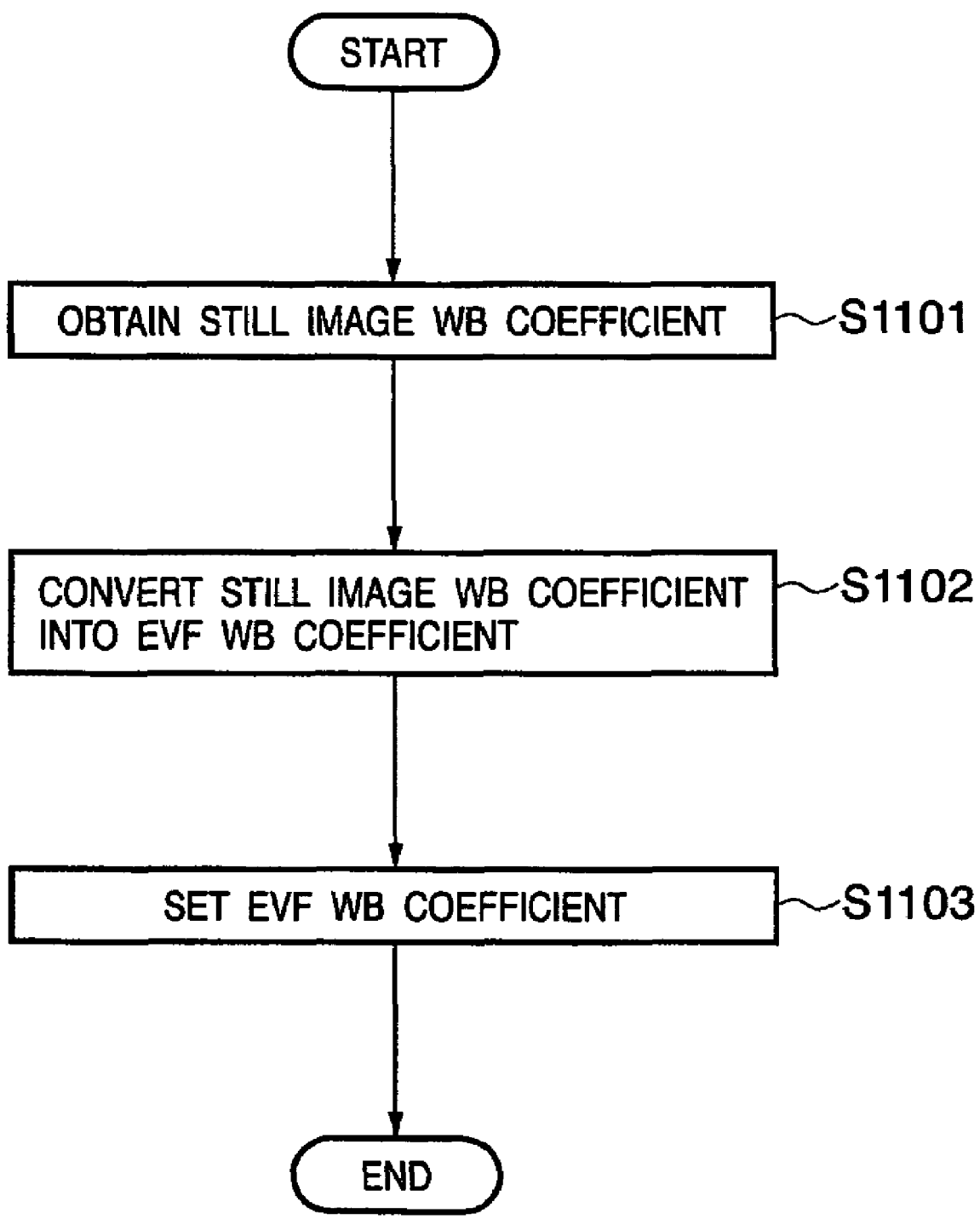
FIG. 11 is a flowchart showing a white balance operation process when returning to EVF in the image sensing apparatus according to the second embodiment.

FIG. 10 is a flowchart for explaining the process of still image sensing while moving image sensing is not performed, in an image sensing mode.

In step S1001, the state of a mode dial 60 is checked. If the state of the mode dial 60 has changed from the image sensing mode, the flow returns to step S201 in FIG. 2. If the image sensing mode is maintained, the flow advances from step S1001 to step S1002 to determine whether a shutter button is in a half-stroke state, i.e., a shutter switch (SW1) 62 is ON. If the shutter switch (SW1) 62 is OFF, the flow advances to step S1003 to continue through image display. That is, an EVF WB control value is calculated, and through image display (EVF display) is performed on an image display unit 28 using the calculated WB control value. In step S1005, an image processing circuit 20 executes predetermined photometry for a signal obtained from the image sensing element 14, and stores the arithmetic result in a memory 30. On the basis of the arithmetic result, a system control circuit 50 executes an AE process for through image sensing by using an exposure control unit 40. After that, the flow returns to step S1001.

Figure 12:
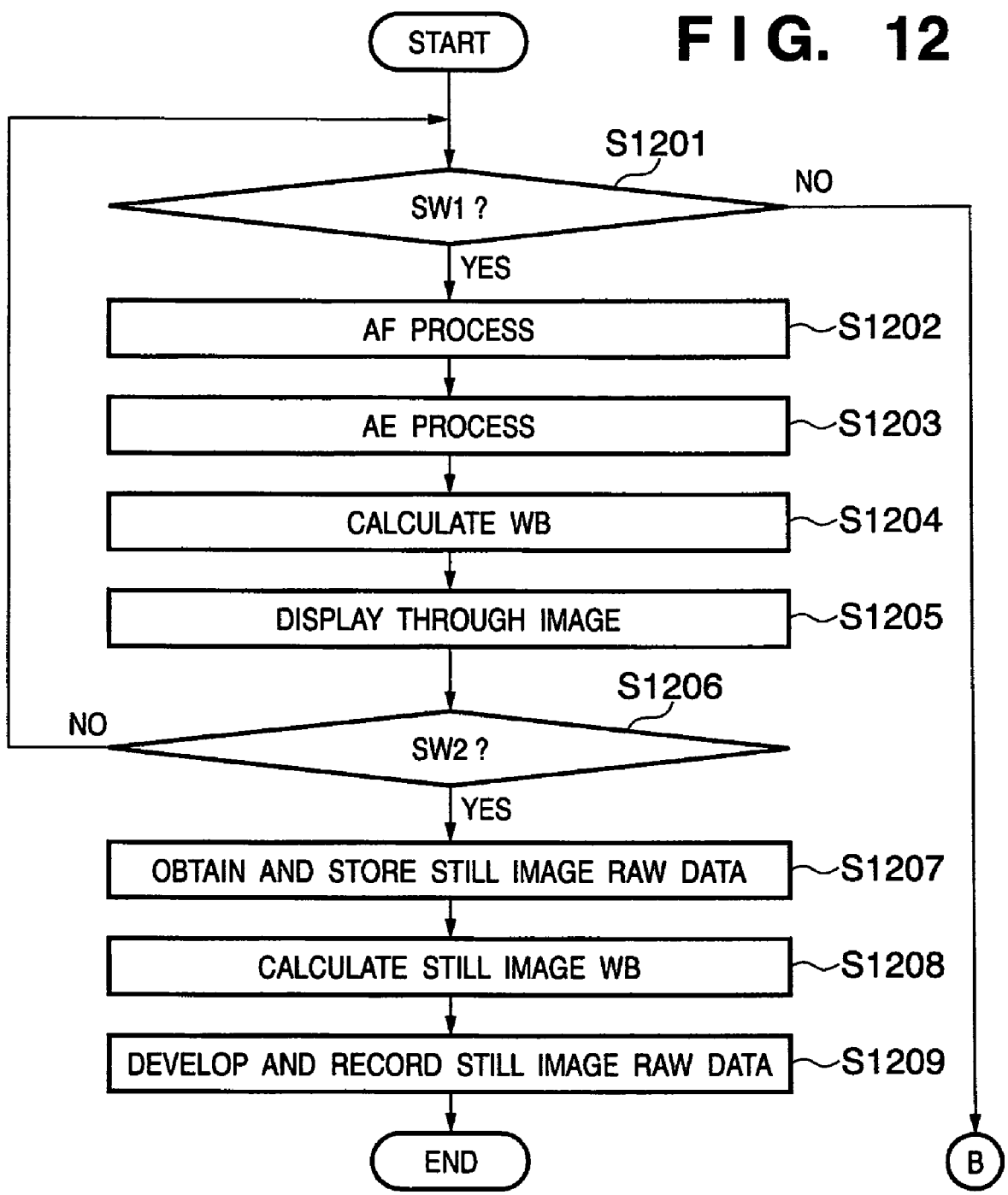
FIG. 12 is a flowchart showing an operation process of still image sensing in the image sensing apparatus according to the second embodiment.

When the shutter switch (SW1) 62 is turned on, the flow advances from step S1002 to step S1006 to perform a still image sensing process. FIG. 12 is a flowchart showing the still image sensing process in step S1006. When the shutter switch (SW1) 62 is turned off, this process ends to return to a still image sensing standby state. Hence, in step S1201, it is determined whether the shutter switch (SW1) 62 is ON. If the shutter switch (SW1) 62 is OFF, the flow returns to step S1001 to return to the still image sensing standby state. On the other hand, if the shutter switch (SW1) 62 is ON (when the half-stroke state of the shutter button is maintained), the flow advances to step S1202.

A still image sensing AF process is performed in step S1202, and a still image sensing AE process is performed in step S1203. These processes are then locked. That is, the image processing circuit 20 executes predetermined distance measurement for the signal obtained from the image sensing element 14, and the arithmetic result is stored in the memory 30. On the basis of the distance measurement arithmetic result, the system control circuit 50 performs the AF process by using a zoom control unit 44, focuses a lens 10 on an object, and maintains the AF state. In the AE process, the image processing circuit 20 executes photometry for the signal obtained from the image sensing element 14, and the photometry arithmetic result is stored in the memory 30. On the basis of the photometry arithmetic result, the system control circuit 50 adjusts and fixes exposure (the stop of a shutter 12) by using the exposure control unit 40.

In step S1204, the EVF display WB control value is calculated based on the image data obtained by driving the image sensing element 14 for EVF display. This WB control value is calculated only once when the shutter switch (SW1) 62 is turned on, and the WB control value is also locked. Accordingly, in the half-stroke state of the shutter button, a WB process is performed using the WB control value obtained when the shutter switch (SW1) 62 is turned on. In step S1205, through image display (EVF display) is executed.

When the shutter button is fully pressed, a shutter switch (SW2) 64 is turned on. When the shutter switch (SW2) 64 is turned on, the flow advances from step S1206 to step S1207 to execute the still image sensing process. In step S1207, an exposure process is executed for still image sensing. In this exposure process, unprocessed image data (still image RAW data) which is read out from the image sensing element 14 via the A/D converter 16 and has not undergone a signal process is saved in the memory 30. In step S1208, the image processing circuit 20 reads out the still image RAW data stored in step S508, and calculates the WB control value based on the readout data. This WB control value is then stored in the memory 30.

In step S1209, a development process including color correction (white balance) using the still image WB control value calculated in step S1208 is performed for the still image RAW data stored in the memory 30 in step S1207. After that, a predetermined compression process such as JPEG is performed for the image data obtained in the development process, and the obtained compressed image data is saved in the memory 30 as a still image file.

As described above, upon completion of the still image sensing process (step S1006), the flow advances to step S1007. Review display of the still image sensed in step S1006 is performed for a predetermined period of time, and the flow advances to step S1008. In step S1008, the white balance process is executed to restore an EVF state. The details of the EVF returning WB process (S1008) will be described in the flowchart of FIG. 11.

In step S1101, the white balance control value based on the still image RAW data in step S506 is read out from the memory 30, and the readout value is stored in the memory 30 as the still image white balance control value. Sequentially, in step S1102, the still image white balance control value stored in the memory 30 in step S1101 is converted into the EVF white balance control value. The converted value is then stored in the memory 30 as the EVF white balance control value. The conversion method has been described in FIG. 8. In step S1103, the EVF white balance control value calculated in step S1102 is set to the image processing circuit 20, and the EVF returning white balance process ends.

Figure 13:
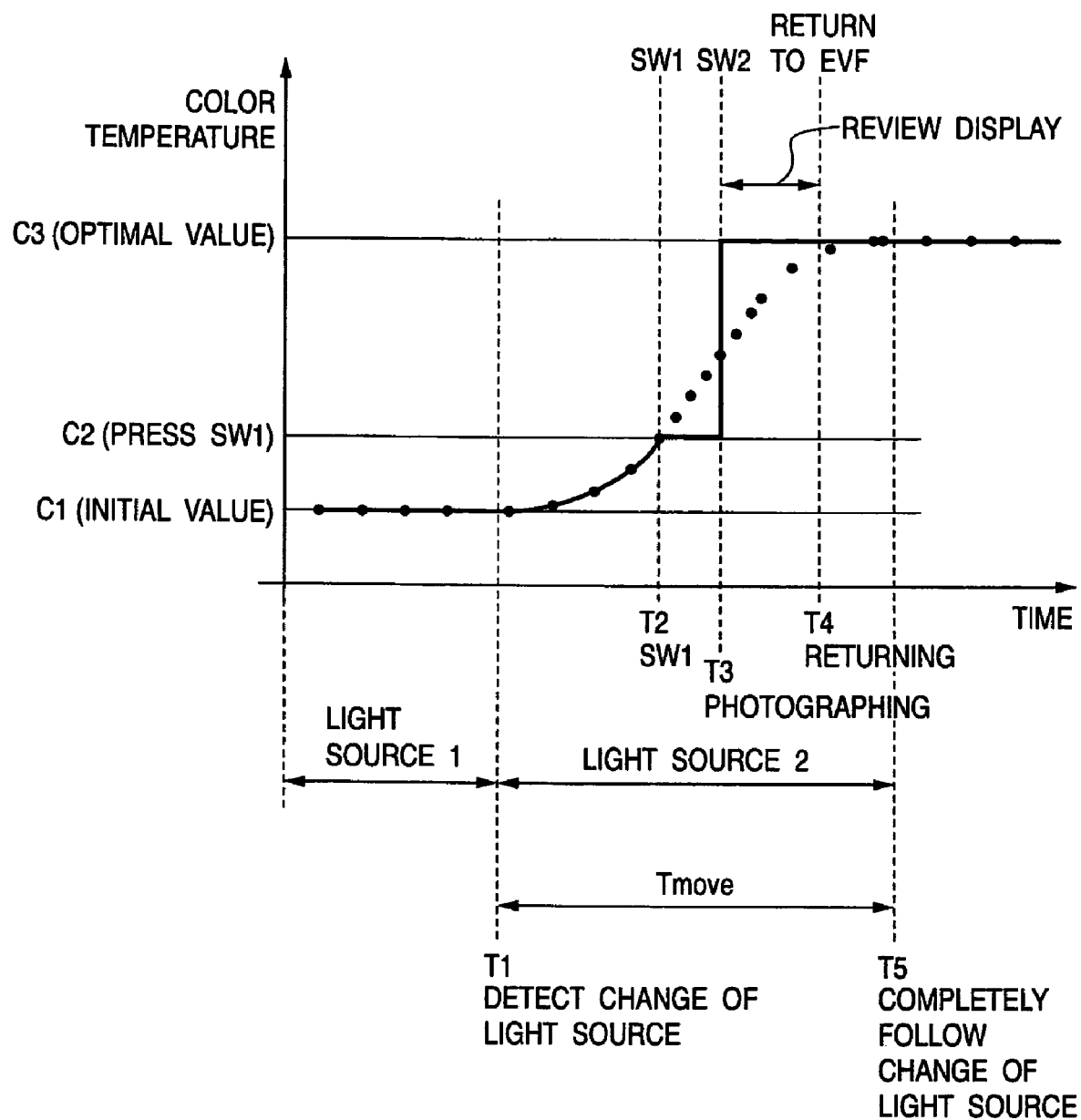
FIG. 13 is a graph showing a change, in a time direction, of a white balance process before and after still image sensing in the image sensing apparatus according to the second embodiment.

FIG. 13 is a graph showing a case wherein the WB changes following the change of an object light source before and after still image sensing. As in FIG. 9, when the still image sensing white balance control value is converted into the EVF WB control value, a color temperature C3 can be maintained even after returning from the review image display to the EVF state. The EVF WB control value is also controlled to completely change the WB following the change of the light source with the time Tmove upon detection of the change of the light source. The process shown in FIG. 13 is different from that shown in FIG. 9 in that, when the shutter switch (SW1) 62 is turned on at the time T2, the white balance control value is fixed to the value at the time T2 (S1204), and the change of the object light source is completely followed by still image sensing at the time T3.

In contrast to this, a general image sensing apparatus does not generate the EVF display WB control value based on the still image data. Hence, the WB control value (the WB control value at the time T2 in FIG. 13) immediately before still image sensing is used as the EVF display WB control value when returning from the review display state to the EVF display state. Therefore, the color appearance of review display after still image sensing becomes different from that obtained when returning to the EVF display state, and display becomes unnatural. In the second embodiment, the EVF WB control value corresponding to the still image sensing WB control value can be obtained, thus preventing such unnatural impression.

In the second embodiment, the state returns to the standby state (EVF display state) after review display based on the still image photographed by still image sensing. Thus, the color appearance in EVF display after still image sensing becomes more similar to that of the review display image than that obtained at the start of the shutter button half stroke operation (when the shutter switch (SW1) 62 is ON) for still image sensing.

The above-described moving image returning WB process in step S1008 is a process without electronic flash sensing in the still image sensing process in step S1006. In order to perform electronic flash sensing in step S1006, the following processes are performed in the moving image returning WB process in step S1008.

The WB control value (the WB control value at the time T2 in FIG. 9) immediately before still image sensing is obtained as the WB control value corresponding to the driving mode of moving image sensing when returning to the moving image sensing state (S1101). After that, without performing the process in step S1102, the obtained WB control value is set to the image processing circuit (S1103). That is, the color appearance in moving image sensing after still image sensing during moving image sensing becomes more similar to that obtained at the start of the shutter button half stroke operation (when the shutter switch (SW1) 62 is ON) for still image sensing than that of the review display image.

The color temperature in electronic flash sensing is largely different from those in other states. Therefore, the color appearance becomes unnatural when the obtained WB control value is applied to moving image sensing after still image sensing, regardless of electronic flash sensing.

According to the embodiments, the driving modes of the read-out process from the image sensing element 14 in still image sensing and the read-out process for EVF display in moving image sensing are switched by switching the substrate voltages of the image sensing element 14 in accordance with the signal from a timing generation circuit under the control of the system control circuit 50.

As described above, according to the embodiments, the WB control value obtained by the signal process in still image sensing is used when returning to the still image sensing standby state (EVF display before moving image sensing or still image sensing) after still image sensing. That is, the still image sensing WB control value is converted into the WB control value corresponding to the driving mode of the image sensing element in the still image sensing standby state, and the converted WB control value is set. Therefore, color continuity between the still image sensing review image and the image in the still image sensing standby state can be maintained, and the still image sensing standby state can be started from when the WB changes following the change of the object light source. For example, in the first embodiment, in still image sensing in the moving image sensing mode, when the thumbnail image of a still image is used as the substitution frame of a moving image omitted by still image sensing, color continuity between the substitution frame image and the image sensed in restarting moving image sensing upon completion of still image sensing is not lost. Also, moving image sensing can be restarted while the object light source color is corrected. In the second embodiment, in the still image sensing mode, color continuity between the still image sensing review image and the image obtained when returning to the electronic viewfinder state is not lost. Also, the state can be returned to the EVF state while the object light source color is corrected.

According to the embodiments, the substrate voltages are switched depending on still image sensing and moving image sensing (moving image sensing in the first embodiment, or EVF display before still image sensing in the second embodiment). However, the present invention is not limited to this. The same substrate voltage may be used in still image sensing and moving image sensing. In this case, the white balance control value based on the image obtained in still image sensing is not converted into the white balance control value corresponding to the spectral sensitivity characteristic of the image sensing element. The image obtained by moving image sensing after still image sensing can be corrected using the unconverted white balance control value.

According to the embodiments, in moving image sensing after still image sensing, the image is obtained by using the white balance control value based on the image obtained in still image sensing. However, the present invention is not limited to this. That is, the color appearance of the image (for example, the fourth moving image frame in FIG. 7) obtained by moving image sensing after still image sensing may be controlled to be more similar to that (for example, the still image or thumbnail still image in FIG. 7) obtained by still image sensing than that (for example, the third moving image frame in FIG. 7) obtained between SW1 and SW2.

More specifically, the white balance control value which immediately changes following the change of a light source in the same method as in still image sensing is calculated based on the image (for example, the third moving image frame in FIG. 7) obtained between SW1 and SW2 (note that the third moving image frame has undergone white balance control as in the first embodiment). The image (for example, the fourth moving image frame in FIG. 7) obtained by moving image sensing after still image sensing may be corrected in accordance with the calculated white balance control value. According to the embodiments, these operations are performed in moving image sensing and still image sensing. However, the present invention is not limited to this.

For example, regardless of moving image sensing and still image sensing, a substrate voltage to be applied to a moving image sensing element may serve as the first substrate voltage to drive the moving image sensing element (the image sensing element has the first spectral sensitivity characteristic) or the second substrate voltage to drive the image sensing element (the image sensing element has the second spectral sensitivity characteristic).

Other Embodiment of Present Invention

Note that the present invention may be applied to either a system constituted by a plurality of devices, or an apparatus consisting of a single device.

In order to operate various devices for realizing the functions of the above-described embodiments, it is needless to say that the present invention can be applied to the case which can be attained even by supplying a software program codes for realizing the functions of the above-described invention, from a storage medium or via a transmission medium such as the Internet to a computer of the system or the apparatus connected to the various devices, and causing the various devices to operate in accordance with a program stored in the computer (CPU or MPU) of the system or the apparatus.

In this case, the program code itself of the software realizes the functions of the above-mentioned embodiments, and a unit which supplies the program code itself and its program code to a computer, e.g., the storage medium which stores the program code constitutes the present invention. As the storage medium for storing the program code, for example, a flexible disk, hard disk, optical disk, magneto-optical disk, CD-ROM, magnetic tape, nonvolatile memory card, ROM, and the like may be used.

The functions of the above-mentioned embodiments may be realized not only by executing the program code by the computer but also by cooperating with an OS (operating system) running on the computer or another application software, as a matter of course.

Furthermore, the functions of the above-mentioned embodiments may be realized by some or all of actual processing operations executed by a CPU or the like arranged in a function extension board or a function extension unit on the basis of the instructions of the program codes, after the supplied program code is stored in a memory of the extension board or unit of the computer or the function expansion unit connected to the computer.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-123989 filed on Apr. 21, 2005, which is hereby incorporated by reference herein in its entirely.

What is claimed is:

1. An image sensing apparatus comprising:
an image sensing unit adapted to perform a second operation of executing a still image sensing to obtain a first image signal while said image sensing unit performs a first operation of performing moving image sensing, by stopping performing the first operation of moving image sensing;
a display unit adapted to display an image signal;
a first control unit adapted to control so as to obtain a white balance control value based on the first image signal obtained by the still image sensing, correct the first image signal based on the white balance control value, and display the corrected first image signal on said display unit;
a restarting unit adapted to cause said image sensing unit to restart the first operation of moving image sensing after the still image sensing; and
a second control unit adapted to control so as to correct a second image signal obtained in the first operation of moving image sensing restarted by said restarted unit after the still image sensing, based on the white balance control value obtained in accordance with the first image signal, and display the corrected second image signal on said display unit after the first image signal is displayed on said display unit.

2. The apparatus according to claim 1, wherein the first operation includes an operation of setting the moving image to allow play back after the moving image sensing.

3. The apparatus according to claim 1, further comprising third control unit adapted to control so as to use, as a part of the moving image, the first image signal obtained by the still image sensing,
wherein the first image signal used as the part of the moving image is corrected in accordance with the white balance control value based on the first image signal obtained by the still image sensing.

4. The apparatus according to claim 1, wherein the first operation includes an operation of displaying the moving image on said display unit in order to confirm, before the still image sensing, an object for which the still image sensing is performed.

5. The apparatus according to claim 1, further comprising switching unit adapted to switch, between the first operation and the second operation, a spectral sensitivity characteristics of the image sensing element to obtain the first image signal and the second image signal,
wherein said second control unit controls to convert the white balance control value obtained based on the first image signal into a white balance control value corresponding to the spectral sensitivity characteristic of the image sensing element in the first operation, and correct the second image signal using the converted white balance control value.

6. A control method comprising:

an image sensing step of performing a second operation of executing a still image sensing to obtain a first image signal in a first operation of performing a moving image sensing, by stopping performing the first operation of moving image sensing;

a display step of displaying an image signal on a display unit;

a first control step of controlling to obtain a white balance control value based on the first image signal obtained by the still image sensing, correct the first image signal based on the white balance control value, and display the corrected first image signal on display unit;

a restarting step of restarting the first operation of moving image sensing after the still image sensing; and a second control step of controlling to correct a second image signal, obtained in the first operation of moving image sensing restarted in said restarted step after the still image sensing, based on the white balance control value obtained based on the first image signal, and display the corrected second image signal on the display unit after the first image signal is displayed on the display unit.

* * * * *